Jan. 11, 1966  R. E. FLUSKEY  3,228,271
ANTI-FRICTION GUIDE BUSHING
Filed Aug. 7, 1963  3 Sheets-Sheet 1

INVENTOR.
ROBERT F. FLUSKEY
BY
ATTORNEY

Jan. 11, 1966  R. E. FLUSKEY  3,228,271
ANTI-FRICTION GUIDE BUSHING
Filed Aug. 7, 1963  3 Sheets-Sheet 2

*INVENTOR.*
ROBERT F. FLUSKEY
BY
ATTORNEY

Jan. 11, 1966 R. E. FLUSKEY 3,228,271
ANTI-FRICTION GUIDE BUSHING
Filed Aug. 7, 1963 3 Sheets-Sheet 3
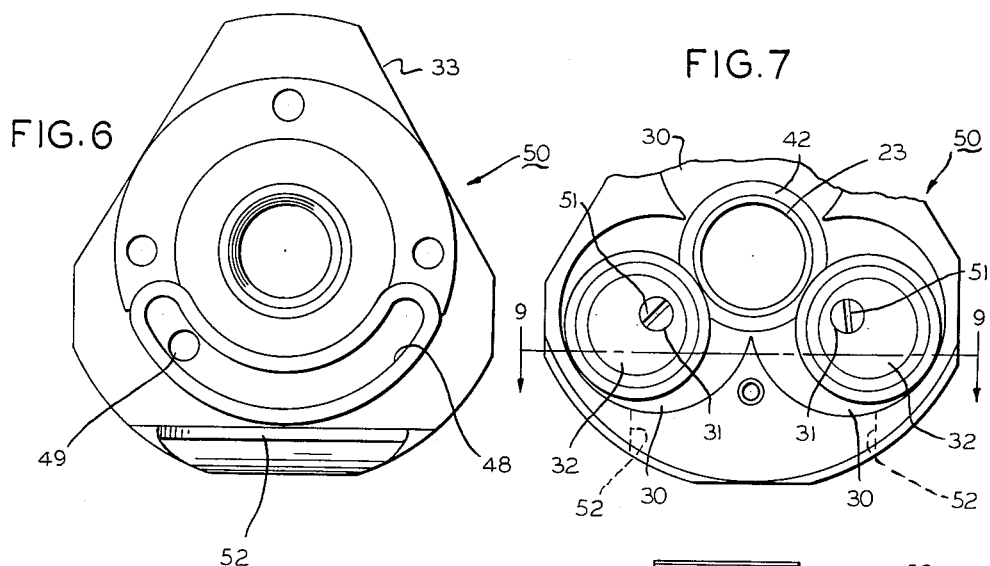
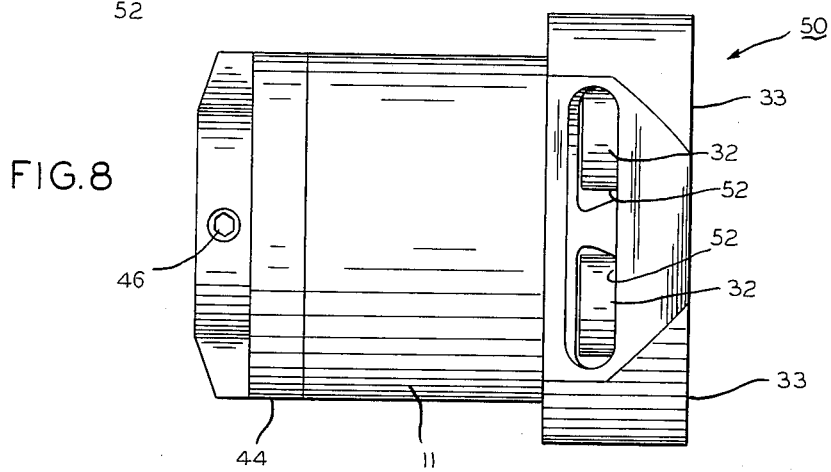
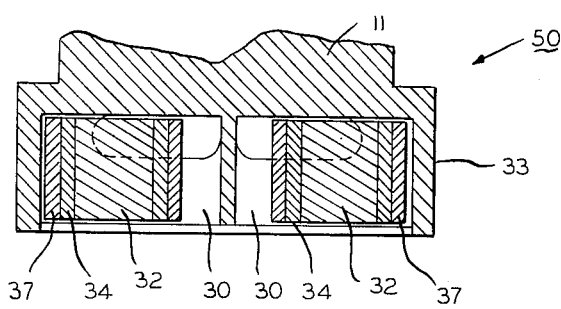
INVENTOR.
ROBERT E. FLUSKEY
BY
ATTORNEY

United States Patent Office 3,228,271
Patented Jan. 11, 1966

3,228,271
ANTI-FRICTION GUIDE BUSHING
Robert E. Fluskey, 782 Hawthorne St., Elmhurst, Ill.
Filed Aug. 7, 1963, Ser. No. 301,233
4 Claims. (Cl. 82—38)

This application is a continuation-in-part of Robert E. Fluskey application Serial No. 256,904, for "Anti-Friction Guide Bushing" filed March 18, 1963, and now abandoned.

This invention relates to guide bushings, and more particularly to a readily adjustable bushing for bar stock of different diameters to be worked upon in an automatic screw machine or the like.

The adjustable guide bushing of the present invention is particularly adaptable for use in a "Swiss-type" automatic screw machine. Such machines are generally provided with a headstock movable axially of the machine frame while rotating the bar stock, and the adjustable bushing according to the present invention makes it possible to support turning bar stock rigidly, and at all times close to the turning tool so as to provide finished parts of high finish and extreme accuracy.

One of the principal objects of the invention is to provide an adjustable guide bushing for supporting turning bar stock of different diameters, such as may be worked upon in an automatic screw machine.

A further object is to provide cavities within which the guide bushings are mounted for both orbital and eccentric movement, and to provide an opening for such cavity through which cuttings may freely drop and clear the guide bushings.

Another object is to provide a guide bushing for turning stock, said bushing being characterized by bushing members capable of being readily adjusted in their radial position according to the diameter of the stock being turned.

Still another object is to provide in apparatus of the class described bushing members which are mounted on eccentrically mounted supports capable of orbital movement about planetary gears, the position of which gears are adjusted and fixed by an adjustably rotatable and locked sun gear.

A yet further object is to provide the ends of the shafts supporting the guide bushings with slots adapted to receive a screw driver or the like for turning the shafts on their centers and the planetary gears about the sun gear for adjustment of the eccentrically mounted bushing members with respect to the work piece.

Other objects and important features of the invention will be apparent from a study of the following specification taken with the drawings, which together describe and illustrate a preferred embodiment of the invention, and what is now considered to be of the best mode of practicing the principles thereof. Other embodiments may be suggested to those having the benefit of the teachings herein, and such other embodiments are intended to be reserved especially as they fall within the scope and spirit of the subjoined claims.

In the drawings:

FIG. 6 is an end view of an alternate form of guide bushing according to the present invention;

FIG. 7 is an opposite end view thereof;

FIG. 8 is a bottom elevational view thereof; and

FIG. 9 is a section taken along the line 9—9 of FIG. 7, looking in the direction of the arrows.

Figures 1, 1A, 2:
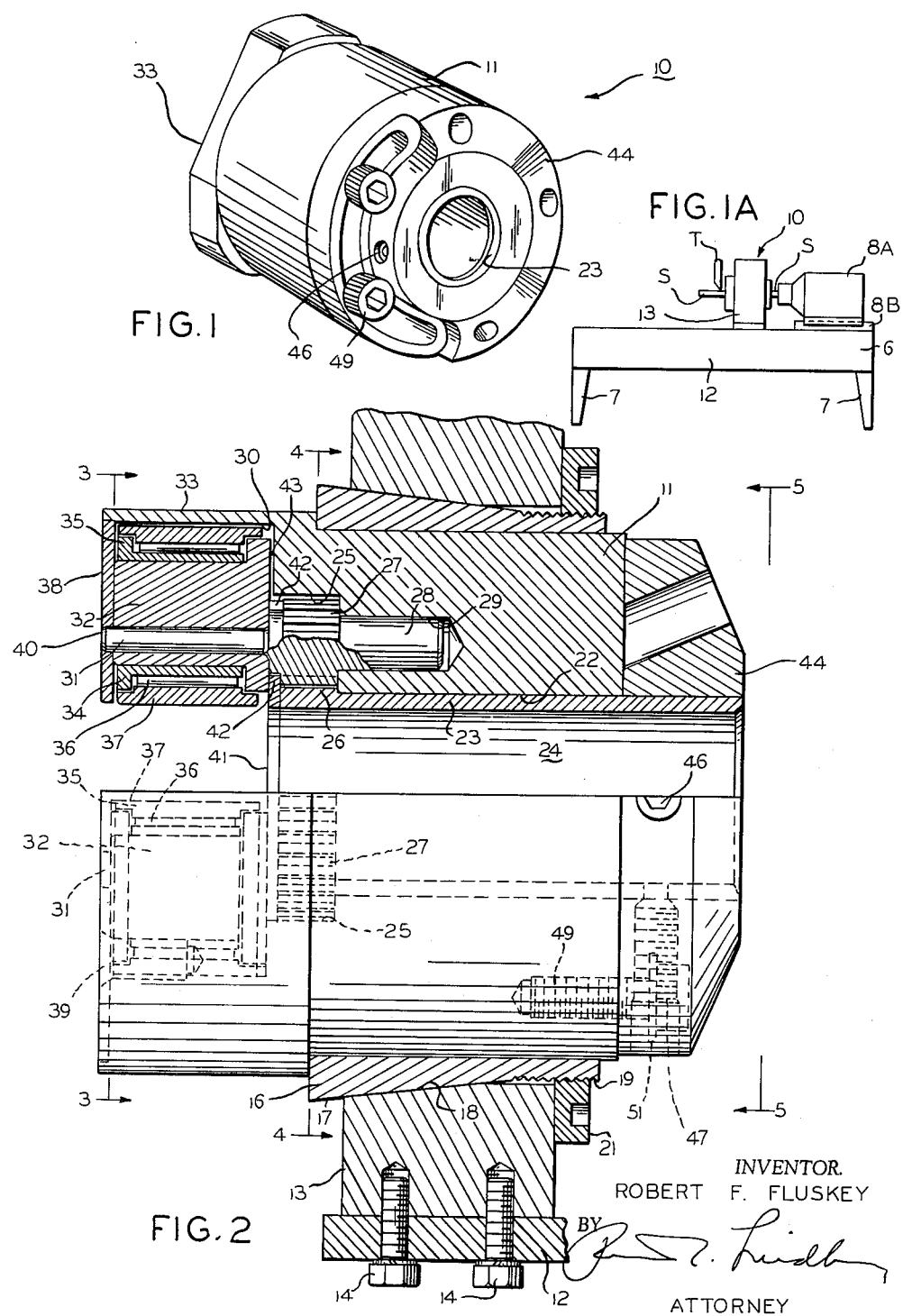
FIG. 1 is an isometric view of a guide bushing embodying the improvements according to the present invention.
FIG. 1A is a front elevational view showing the guide bushing according to the invention in working position on a "Swiss-type" automatic screw machine.
FIG. 2 is a longitudinal cross section, through the device seen in FIG. 1, showing the same in position on an automatic screw machine.

Referring now particularly to the drawings, the improved guide bushing according to the present invention is referred to generally by the reference numeral 10, and includes a generally cylindrical body member 11 adapted to be positioned for operation on an automatic screw machine referred to by the reference numeral 6. Screw machine 6 consists of a frame 12 supported on legs 7. A longitudinally movable head stock 8A is arranged for movement on a guideway 8B resting on the frame 12, and a length of bar stock S is mounted for rotative movement in head stock 8A, bar stock S extending through guide bushing 10 which is mounted on frame 12. Bar stock S is adapted to be worked upon by a turning tool T in a manner well known in the art in which the bar stock is supported by guide bushing 10.

A support member 13 for the guide bushing 10 is held to the frame 12 by means of cap screws 14. The body member 11 is held to the support member 13 in a retaining ring 16 having a tapered external surface 17 which is complementary to a tapered opening 18 in the support member 13. One end of the tapered retaining ring 16 is provided with threads 19 which cooperate with an internally threaded locking ring 21 to hold the body member 11 in the support 13.

The body member 11 has a longitudinally extending bore 22 receiving a generally sleeve-like member 23 having a bore 24 therein through which the bar stock S extends while the bar stock S is supported and worked upon by tool T.

Figure 4:
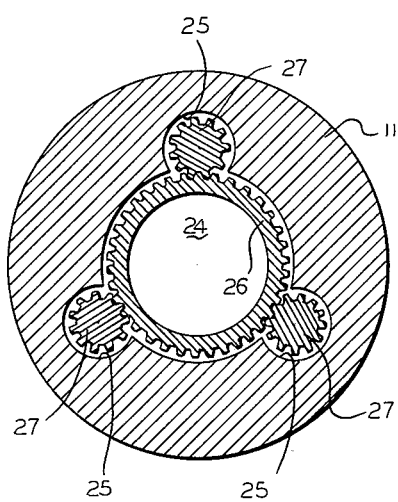
FIG. 4 is a transverse sectional view looking in the direction of the arrows 4—4 of FIG. 2.
Figure 5:
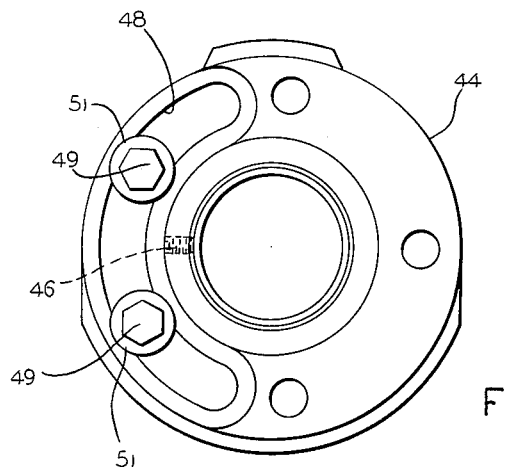
FIG. 5 is an end view looking in the direction of the arrows 5—5 of FIG. 2.

The sleeve-like member 23 is formed at one end with a sun gear 26 adapted to mesh with a plurality of planet gears 27 having stub shafts 28 received in recesses 29 in the body member 11. As seen in FIG. 4, each of the planet gears 27 turns within a cavity 25 in body member 11, and the planet gears 27 are arranged in 120° apart positions with respect to the sun gear 26.

Each of the planet gears 27 is integral with a stub shaft 31 made fast in any suitable fashion to an eccentric 32, the center of which is arranged to move in an orbital fashion with respect to the planet gear 27.

Figure 3:
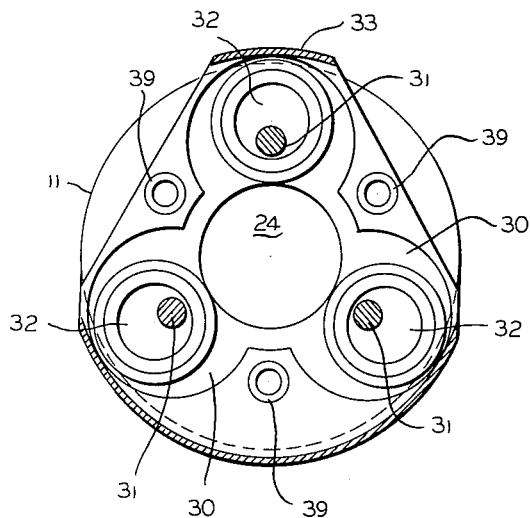
FIG. 3 is an elevational view looking in the direction of the arrows 3—3 of FIG. 2.

As seen with particular reference to FIG. 3, the eccentric members 32 are arranged for such orbital movement within cavities 30 arranged within a generally triangular-shaped housing 33 formed integrally with the tubular body member 11 at one end thereof. Each of the eccentric members 32 is arranged to support freely turning needle bearing assemblies 35 comprising an inner race 34, needle bearing members 36 and an outer race 37. The outer race members 37 are arranged to move into contact upon rotative movement of the planet gears 27 with the bar stock extending lengthwise of the bore 24. The three outer race members accordingly form three-point support for the bar stock S while the same may freely rotate therein.

A cover plate 38 for the bearing assemblies 35 as well as the eccentric members 32 is held to the end of the housing 33 by means of holding screws 39, as seen more particularly in FIG. 3. Cover plate 38 has openings 40 therein through which the stub shafts 31 supporting the eccentrics 32 extend.

A small spider 41 is interposed between gearing assembly comprising the planet gears 27 and the sun gear 26 and the eccentric members 32, the spider 41 having arms 42 which straddle the stub shafts 28 for the planet gears 27. The arms 42 of the spider 41 serve to space the eccentrics 32 from contact with the end of the body member 11, there being a small amount of spacing provided as seen at 43 in FIG. 2.

Structure is provided for imparting rotation to the sun gear 26, so as to vary the orbital position of the eccentrics 32 and the bearing assemblies 35 carried thereby, according to the diameter of the bar stock S extending longitudinally within the bore 24. To this end, the end of the sleeve member 23 remote from the sun gear 26 is made fast to an adjusting knob indicated generally by the reference numeral 44. A short set screw 46 and a pair of longer set screws 47 afford a driving connection between the adjusting knob 44 and the sleeve 23, one such set of screws 47 being shown in FIG. 2.

Adjusting knob 44 has an arcuate slot 48 which moves about a pair of locking bolts 49, each locking bolt 49 being provided with a locking washer 51. As seen in FIG. 2, the locking bolt 49 is tapped into the end of the body member 11.

In order to adjust the rotative position of the sun gear 26 for the purpose as previously described, the locking bolts 49 are first released, and the adjusting knob 44 rotated until the bearing assemblies 37 are in contact with the bar stock S extending lengthwise of the bore 24. At such time the bearings 37 are in contact with the bar stock S, the bar stock is given three-point support thereby, the bar stock S being enabled to rotate freely within bore 24. After being thus supported the adjusting knob 44 is locked in position by threading the locking screws 49 into locking position in the body member 11.

Referring now to FIGS. 6 to 9 inclusive of the drawings, there is shown another embodiment of the invention indicated generally by the reference numeral 50. In this embodiment of the invention, the stub shaft 31 supporting the eccentric 32 has the exposed end thereof provided with a slot 51 to receive a screw driver or other similar tool, not shown. Such tool is arranged to rotate the stub shaft 31 and in turn the planet gear 27, not shown in these figures. It will be understood that the adjusting knob 44 will be released to permit back driving of the sun gear 26 when the stub shafts 31 are turned.

The structure described with reference to FIGS. 6 to 9 enables the contact of the needle bearing assemblies 35 with the turning stock S to be nicely adjusted from the end of the guide bushing 50 where the stock S is held, as well as from the opposite end thereof.

In order to insure that cuttings resulting from operations on the turning stock S by tool T will not clog or impair the free contact of the bearing members with the turning stock, a bottom opening 52 is provided in the triangular shaped housing 33, the opening 52 intersecting the two bottom cavities 30 in housing 33.

While the invention has been described in terms of some preferred embodiments thereof, it is to be understood that the scope of the invention is not intended to be limited by the precise embodiments herein shown, the scope of the invention being intended to be defined only by the terms of the claims here appended.

I claim:

1. In an adjustable guide bushing for a Swiss-type automatic screw machine having a head stock for rotating bar stock, a body section, sun gear supporting means extending lengthwise of said body section comprising a tubular member adapted to form a passage for said rotating bar stock, sun gear means mounted on said supporting means, a plurality of planet gears adapted to mesh with said sun gear including means for supporting said planet gears in said body section, an eccentric member extending from each of said planet gears, a bearing member freely supported for turning on each of said eccentric members and adapted upon rotation of its supporting planet gear to move orbitally with its said eccentric member into contact with bar stock extending lengthwise of said body section and within said tubular member, a housing at one end of said body section for said eccentric members, means secured at one end of said tubular member for rotating said tubular member and said sun gear to cause concomitant rotation of said planet gear and orbital movement of each of said eccentrics and the roller members supported thereby into supporting contact with said bar stock, said means including an arcuate slot therein, and means for locking said last named means to said body section including fastening means extending through said arcuate slot and holding said last named means in locked position.

2. In an adjustable guide bushing for a Swiss-type automatic screw machine having a head stock for rotating bar stock, a body section, sun gear supporting means extending lengthwise of and body section comprising a tubular member adapted to form a passage for said rotating bar stock, sun gear means mounted on said supporting means, a plurality of planet gears adapted to mesh with said sun gear including means for supporting said planet gears in said body section, an eccentric member extending from each of said planet gears, a bearing member freely supported for turning on each of said eccentric members and adapted upon rotation of its supporting planet gear to move orbitally with its said eccentric member into contact with bar stock extending lengthwise of said body section and with said tubular member, a housing at one end of said body section for said eccentric members, means secured at one end of said tubular member for rotating said tubular member and said sun gear to cause concomitant rotation of said planet gear and orbital movement of each of said eccentrics and the roller members supported thereby into supporting contact with said bar stock, and means for locking said last named means to said body section.

3. In an adjustable guide bushing for a Swiss-type automatic screw machine having a head stock for rotating bar stock, a body section, sun gear supporting means extending lengthwise of said body section comprising a tubular member adapted to form a passage for said rotating bar stock, sun gear means mounted on said supporting means, a plurality of planet gears adapted to mesh with said sun gear including means for supporting said planet gears in said body section, an eccentric member extending from each of said planet gears, a bearing member freely supported for turning on each of said eccentric members and adapted upon rotation of its supporting planet gear to move orbitally with its said eccentric member into contact with bar stock extending lengthwise of said body section and within said tubular member, means secured to said tubular member for rotating said tubular member and said sun gear to cause concomitant rotation of said planet gear and orbital movement of each of said eccentrics and the roller members supported thereby into supporting contact with said bar stock, and means for locking said last named means to said body section.

4. In an adjustable guide bushing for a Swiss-type automatic screw machine having a head stock for rotating bar stock, a body section, sun gear supporting means extending lengthwise of said body section comprising a tubular member adapted to form a passage for said rotating bar stock, a sun gear mounted on said supporting means, a plurality of planet gears adapted to mesh with said sun gear including means for supporting said planet gears in said body section, an eccentric member extending from each of said planet gears, a bearing member freely supported for turning on each of said eccentric members and adapted upon rotation of its supporting planet gear to move orbitally with its said eccentric member into contact with bar stock extending lengthwise of said body section and within said tubular member, and a cavity at one end of said body section for enclosing said eccentric members, and an opening in said body section intersecting the lower portions of said cavity to provide discharge of any cuttings entering said cavity.

References Cited by the Examiner
UNITED STATES PATENTS

| | | | |
|---|---|---|---|
| 1,470,158 | 10/1923 | Garrison | 279—106 |
| 2,612,809 | 10/1952 | Shager | 82—39 |
| 2,757,565 | 8/1956 | Fluskey et al. | 82—39 |

FOREIGN PATENTS 610,656  10/1948  Great Britain.

WILLIAM W. DYER, Jr., *Primary Examiner.*